July 2, 1968  R. S. WOOD ET AL  3,390,591
CRANK ARMS AND THE LIKE FOR LINKAGES
Filed March 7, 1966  2 Sheets—Sheet 1
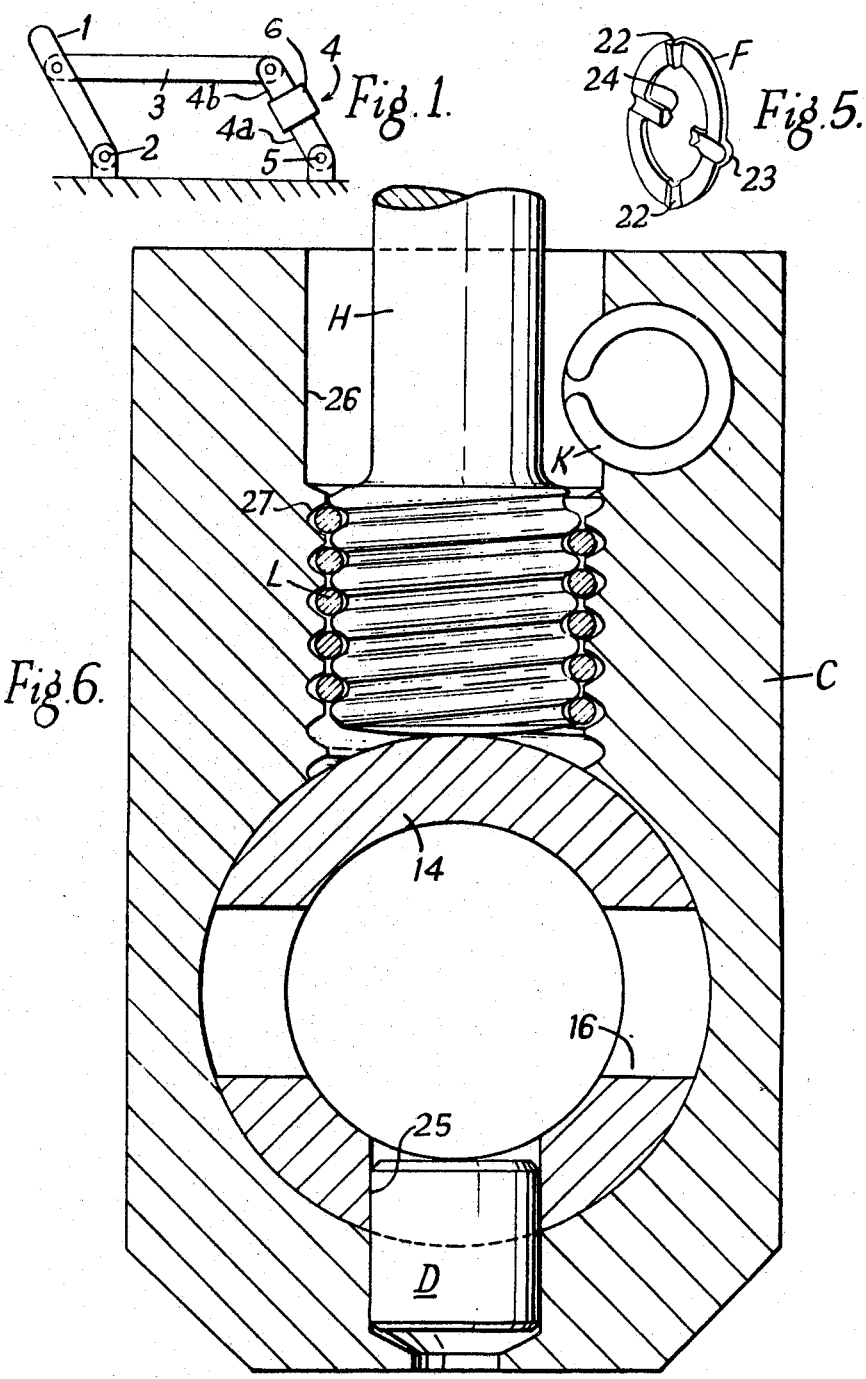

July 2, 1968   R. S. WOOD ET AL   3,390,591
CRANK ARMS AND THE LIKE FOR LINKAGES
Filed March 7, 1966   2 Sheets-Sheet 2
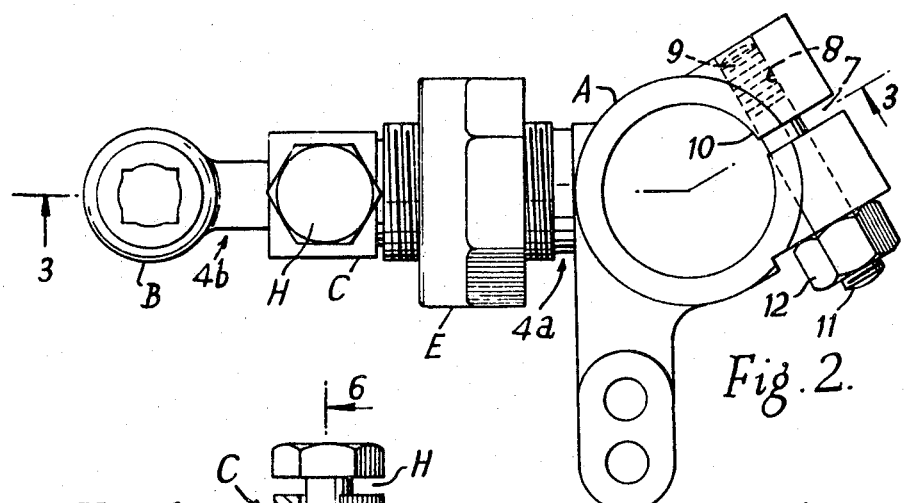
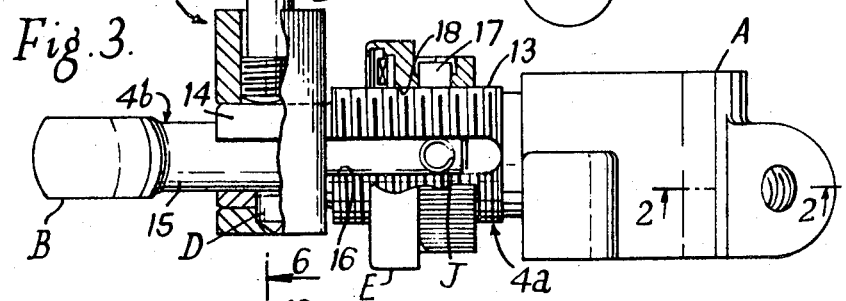
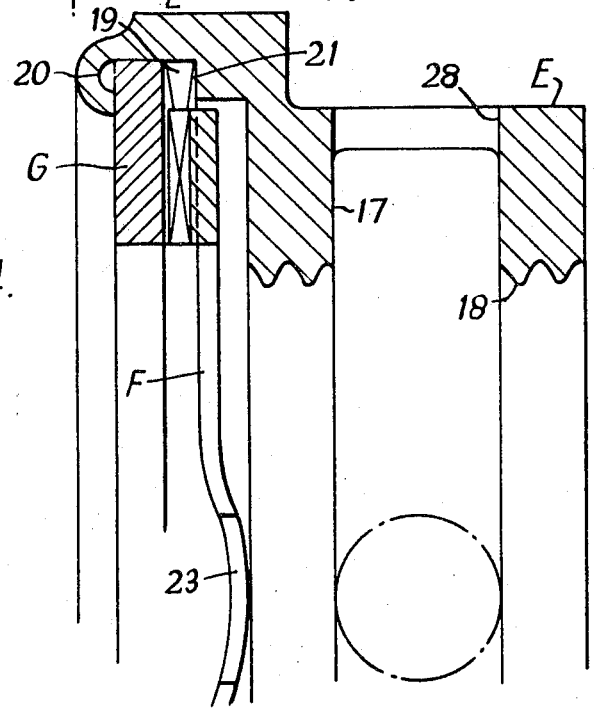

United States Patent Office 3,390,591
Patented July 2, 1968

3,390,591
CRANK ARMS AND THE LIKE FOR LINKAGES
Robert S. Wood, Alverstoke, Gosport, and Denis V. Butler, Catisfield, Fareham, England, assignors to The Plessey Company Limited, Ilford, England, a British company
Filed Mar. 7, 1966, Ser. No. 532,375
Claims priority, application Great Britain, Mar. 17, 1965, 11,328/64
3 Claims. (Cl. 74—522)

ABSTRACT OF THE DISCLOSURE

A linkage arm is made adjustable in length by means of a nut engaging external screw threads of a bush extending from one end of the arm and serving as a guide for a stem extending from the other end of the arm and having a cross pin which extends through longitudinal slots of the bush into a circumferential groove inside the nut. The nut is equipped with a click stop device to facilitate gauging the amount of adjustment, and a clamping screw is arranged in a block fitted on the threadless extremity of the bush, to allow the two part-shells of the bush to be urged by the locking screw towards each other to clamp the stem.

---

This invention relates to linkages of the kind often employed for transmitting movement from a pivoted element, such as for example an operator's lever or a mechanically movable arm in a machine, to another part carrying an arm by means of a link interconnecting the two arms referred-to and pivoted to the two arms in an appropriate manner. In some cases it is desirable for the angles of movement of the two arms to be adjustable relative to each other; this can be achieved very conveniently if the distance of the pivotal connection of the link to one of the arms from the pivot or fulcrum about which the arm is movable, can be adjusted. Such accurate adjustment of the length is for example desirable in certain fuel-supply systems and certain lubricating devices.

The present invention has for an object to provide improved means by which the effective length of a crank arm can be conveniently adjusted while minimising the risk of accidental alteration of the length once the adjustment has been effected. With this object in view the invention provides a crank arm for co-operation with a link in a linkage system which comprises two members respectively including the fulcrum of the arm and means for pivotal connection to such link a first one of these members including an externally screw-threaded shaft having an axial bore or passage, and the other member including a stem longitudinally slidable in said bore to vary the distance between the fulcrum and the pivotal connection means, the first member having a longitudinal slot through which a pin extends radially from the stem of the other member, while a nut rotatably mounted on the screw-threads of the first-mentioned member has an internal circumferential groove, into which said pin extends, whereby longitudinal displacement of the nut due to its rotation on the screw threads forces the second member to undergo similar longitudinal displacement relative to the first member. In order to give an indication of the amount of adjustment effected, particularly when the arm is in a relatively inaccessible position, a click-stop device is preferably provided, which indicates the amount by which the nut has been turned.

According to another feature of the invention, the first member is preferably further equipped with a clamping device for the stem of the second member, so that when the clamping device is tightened, the two members are firmly connected to maintain a predetermined distance between the fulcrum and the pivotal connection means.

One embodiment of the invention is illustrated in the accompanying drawing, in which:

FIGURE 1 is a somewhat diagrammatic elevation of a linkage including an arm having adjustment means according to the present invention, FIGURE 2 is a side elevation of the adjustable arm, FIGURE 3 is a plan view, partly in section on line 3—3 of FIGURE 2, FIGURE 4 is an enlarged detail of some elements shown in FIGURE 3, FIGURE 5 is a perspective view of one of the elements shown in FIGURE 4, and FIGURE 6 is an enlarged section on line 6—6 of FIGURE 3.

Referring now first to FIGURE 1, a lever 1, movable about a fixed pivotal fulcrum 2, may be a hand lever or a mechanically moved machine element. Its movement is transmitted by a link 3 to an arm 4 which is pivotally movable by being secured on a shaft 5, so that the arm 4 may be referred to as a crank arm. In some cases it is necessary or desired to correlate the angular movement of the crank arm 4 accurately in a predetermined manner to the movement of the lever 1 about its fulcrum 2. This can be achieved, irrespective of inaccuracies in the position of the fulcrum axis 2 relative to the pivot axis 5 of the arm 4 in a direction transverse to the length of the link 3, if, according to a feature of the present invention, the crank arm 4 is made adjustable in length by being made in two parts 4a and 4b which are respectively connected with the shaft 5 and the link 3, and which are manually displaceable in the longitudinal direction of the arm by means of an adjusting device 6.

One form of an arm incorporating such an adjusting device is illustrated in FIGURES 2 and 3, in which the member 4a comprises a clamping shell A for clamping the member to a shaft such as the shaft 5 of FIGURE 1. The shell A may be slotted at 7 and have a bore 8 for the passage of a clamping screw. Alternatively, as illustrated, a clamping pin 9, having an arcuate recess 10 for co-operation with the surface of the shaft 5, may be slidable in the bore 8 and have a screw-threaded extension 11 fitted with a nut 12, by means of which the pin 9 may be drawn along the bore 8 to exercise by the appropriate part of its arcuate recess 10 a wedge action on the shaft 5. The shell A of the member 4a is formed at the end of a shank comprising an externally screw-threaded portion 13, and in extension of the latter, a smaller-diameter cylindrical portion 14, both these portions 13 and 14 being longitudinally bored to receive slidably a cylindrical stem 15 of the other arm member 4b. This stem extends from an eyelet B adapted for pivotal connection with a link 3. The portions 13 and 14 of the member 4a are slotted longitudinally in a diametric plane as shown at 16 to form a guide path for a pin J, which is secured in a suitable cross-bore of the stem 15 of member 4b. The pin J thus prevents relative rotation of the member 4b relative to member 4a, and it extends, beyond the outer circumference of the screw-threaded portion 13, into an internal circumferential groove 17 formed in an adjuster nut E which has internal screw-threads 18 in engagement with the threads of part 13 of member 4a. It will thus be seen that, when the nut E is rotated on the member 4a, the groove 17, and with it the pin J and therefore the member 4b, will be forced to travel longitudinally relative to the member 4a, while mutual rotation of the two members 4a and 4b is prevented by the engagement of the pin J with the walls of the slots 16. The nut E is further equipped with a click-stop device, which will now be described with reference to FIGURES 4 and 5.

A plate G, having face serrations 19, is centered in a suitable bore of the body of the nut E, where it is secured by being forced against the shoulder of this bore by a spun-over collar 20 of the nut. Located in the axial space ensured between the plate G and the adjacent face of the central portion of the nut body E by a shoulder 21 is a washer F of spring material, which at its circumference has two mating serrations 22 which engage the serrations 19 of the plate G at two diametrically opposite positions, while at right angles thereto the washer is bent to form a transverse ridge 23, while being provided in he same area with a pair of inwardly projecting lugs 24. The lugs 24 engage the slots 16 of member 4a to lock the washer F against rotation about the member 4a. The serrated plate G, due to the fact that its serrations 19 bite into the shoulder 21 under the pressure of the rolled-over portion 20 is constrained to rotate with the nut E, and the ridge portion 23 of the washer F will rest on the face of the nut body E adjacent to the screw-threaded bore so that the resilience of the washer will urge the serrations 22 of the washer F into engagement with the serrations 19 of the plate G. The nut E is finally provided with a transverse through bore 28, FIGURE 4, aligned with the circumferential groove 17, so as to allow the pin J to be introduced through this bore 28 into the cross-bore of the stem 15, and to be expelled from the cross-bore when the nut is in an appropriate position. In order to enable the arm 4 to be clamped against further adjustment or accidental variation of its length once the adjustment has been completed, a locking block C is secured on the reduced-diameter portion of member 4a beyond the screw-threaded portion 13, relative movement of the block C about the axis of the portion 14 being prevented by a pin D in a bore 25 which extends through the wall of part 14 at right angles to the slot 16 and into the body of the block C. In diametric opposition to the bore 25 the block is provided with a further bore 26 of larger diameter, which has internal screw threads 27 accommodating a wire lock L for engagement with the screw threads of a locking bolt H, which after insertion is protected against loss by a tubular pin K. It will be readily appreciated that by tightening the bolt H the two shell portions of the part 14, which are separated by the slots 16, will be sent towards each other, thereby firmly clamping the stem 15 to prevent movement of the stem 15 in the longitudinal direction of the crank 4 unless and until the bolt H is slackened again. When the locking bolt H is slackened, on the other hand, adjustment of the length of arm A can be effected readily by turning the nut E, and the amount of adjustment effected can be readily ascertained, even when the arm is arranged out of sight, due to the fact that the serrations of the spring washer F produce an audible click upon each transition from one serration to the next of the plate G.

An advantage of the described apparatus, which is particularly important when the apparatus is installed in inaccessible places, is that the device is so constructed that no parts can become detached due to over-adjustment and thus drop into other parts of the mechanism or other apparatus to cause a foul. This will be readily appreciated from the following description of the assembly of the apparatus. In assembling, first the adjuster nut E is screwed on to the threaded part of the clamping shell A, then the locking block C with the locking bolt H, which is retained by a tubular pin K, is slipped on to the reduced-diameter part 14 of the clamping shell A, and the pin D is placed into the bore 25. Thereafter the other arm member 4b is inserted into the clamping shell A where its presence retains the pin D and prevents the locking block C from being removed. The transverse hole serving for the reception of spring pin J is then lined up with the slots 16 in the clamping shell A and with the hole in the nut E, whereafter spring pin J is inserted, thus preventing the member 4b from being removed again.

Generally it will be observed that when the assembly has been thus completed, no part can be removed without forcing either the tubular pin K or the spring pin J out of their holes, and that therefore no part can become detached by accidental over-adjustment, the adjustment of adjuster nut E being limited by the body of the clamping shell at one end and the block C at the other end, while unscrewing of locking bolt H is limited by the tubular pin K.

It will also be appreciated that various details of the embodiment described may be varied within the scope of the invention. Thus the described click-stop device may be replaced by some other form of click-stop device giving an audible click signal each time the nut E is turned by a predetermined angle. In this a radially acting spring may be employed instead of the axially acting spring washer F.

What we claim is:

1. A crank arm for co-operation with a link in a linkage system, which comprises two members respectively including the fulcrum of the arm and means for pivotal connection means to such link, a first one of these members including an externally screw-threaded shaft having an axial bore or passage, and the other member including a stem longitudinally slidable in said bore to vary the distance between the fulcrum and the pivotal connection means, the first member having a longitudinal slot through which a pin extends radially from the stem of the other member, while a nut rotatably mounted on the screw-threads of the first-mentioned member has an internal circumferential groove, into which said pin extends, whereby longitudinal displacement of the nut due to its rotation on the screw threads forces the second member to undergo similar longitudinal displacement relative to the first member.

2. A crank arm as claimed in claim 1, which includes a click-stop device operative to indicate the amount by which the nut has been turned.

3. A crank arm as claimed in claim 1, wherein the first member is further equipped with a clamping device for the stem of the second member, so that when the clamping device is tightened, the two members are firmly connected to maintain a predetermined distance between the fulcrum and the pivotal connection means.

References Cited

UNITED STATES PATENTS

| | | | |
|---|---|---|---|
| 2,477,755 | 8/1949 | Langfelder | 74—57 |
| 2,627,188 | 2/1953 | Gaubatz | 74—522 |
| 2,959,978 | 11/1960 | Boutwell | 74—89.15 X |

FRED C. MATTERN, JR., *Primary Examiner.*

MILTON KAUFMAN, *Examiner.*

J. S. CORNETTE, F. D. SHOEMAKER,
*Assistant Examiners.*